(12) United States Patent
Moser

(10) Patent No.: US 9,071,686 B2
(45) Date of Patent: Jun. 30, 2015

(54) SYSTEM AND METHOD FOR AUTOMATED CONNECTION TRIGGERED BY AVAILABILITY STATUS

(71) Applicant: Martin K. Moser, Speyer (DE)

(72) Inventor: Martin K. Moser, Speyer (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/071,033

(22) Filed: Nov. 4, 2013

(65) Prior Publication Data

US 2014/0050310 A1 Feb. 20, 2014

Related U.S. Application Data

(63) Continuation of application No. 11/318,486, filed on Dec. 28, 2005, now Pat. No. 8,649,485.

(51) Int. Cl.
*H04M 11/00* (2006.01)
*H04M 3/42* (2006.01)
*H04M 7/12* (2006.01)

(52) U.S. Cl.
CPC ...... *H04M 3/42365* (2013.01); *H04M 3/42195* (2013.01); *H04M 3/42374* (2013.01); *H04M 7/1235* (2013.01); *H04M 2201/10* (2013.01); *H04M 2201/18* (2013.01); *H04M 2201/38* (2013.01)

(58) Field of Classification Search
CPC .................................................. H04M 3/42365
USPC ....................................................... 379/88.13
See application file for complete search history.

(56) References Cited

U.S. PATENT DOCUMENTS

| | | | |
|---|---|---|---|
| 5,268,957 A | 12/1993 | Albrecht | |
| 6,278,454 B1 | 8/2001 | Krishnan | |
| 6,363,065 B1 | 3/2002 | Thornton et al. | |
| 6,665,293 B2 | 12/2003 | Thornton et al. | |
| 6,683,941 B2 | 1/2004 | Brown et al. | |
| 6,957,077 B2 * | 10/2005 | Dehlin | 455/466 |
| 7,065,197 B1 | 6/2006 | Ramella-Pezza et al. | |
| 7,123,695 B2 | 10/2006 | Malik | |
| 7,218,722 B1 | 5/2007 | Turner et al. | |
| 7,280,530 B2 | 10/2007 | Chang et al. | |
| 7,353,455 B2 | 4/2008 | Malik | |
| 7,369,647 B2 * | 5/2008 | Gao et al. | 379/88.12 |
| 7,376,413 B2 * | 5/2008 | Jordan, Jr. | 455/412.2 |
| 7,480,260 B1 * | 1/2009 | Vashisht et al. | 370/260 |
| 7,603,420 B2 * | 10/2009 | Doan et al. | 709/206 |
| 7,646,856 B2 * | 1/2010 | Bedingfield et al. | 379/88.18 |
| 7,657,598 B2 * | 2/2010 | Daniell et al. | 709/206 |
| 7,660,849 B1 | 2/2010 | Shaffer et al. | |
| 7,668,305 B2 | 2/2010 | Akizuki et al. | |
| 7,707,254 B2 * | 4/2010 | Daniell et al. | 709/206 |
| 7,716,294 B2 * | 5/2010 | Lyle et al. | 709/206 |
| 7,921,160 B2 * | 4/2011 | Malik et al. | 709/206 |
| 7,933,957 B2 * | 4/2011 | Daniell | 709/206 |
| 2002/0136206 A1 | 9/2002 | Gallant et al. | |
| 2002/0181670 A1 | 12/2002 | Myers et al. | |

(Continued)

*Primary Examiner* — Joseph T Phan
(74) *Attorney, Agent, or Firm* — Kenyon & Kenyon LLP

(57) ABSTRACT

A system and method for automated connection triggered by availability status. The present invention includes a method of determining whether a connection request is pending to connect to a previously unavailable party and automatically making the connection now that the party is available. An alternate method includes generating a request to automatically connect to a party when the party becomes available. Application of embodiments of the present invention includes a telephony and/or an internet system.

16 Claims, 12 Drawing Sheets

At desk:

free in call

Forwarding:

forwarded

Substitute:

no free/busy information

Unavailable:

no free/busy information

(56) References Cited

U.S. PATENT DOCUMENTS

| | | |
|---|---|---|
| 2003/0041101 A1 | 2/2003 | Hansche et al. |
| 2003/0229670 A1* | 12/2003 | Beyda .......................... 709/206 |
| 2003/0229722 A1 | 12/2003 | Beyda |
| 2004/0205175 A1 | 10/2004 | Kammerer |
| 2005/0068167 A1 | 3/2005 | Boyer et al. |
| 2005/0262435 A1 | 11/2005 | Ramanujan |
| 2006/0010379 A1 | 1/2006 | Kashi |
| 2006/0190117 A1 | 8/2006 | Weczorek et al. |
| 2006/0259474 A1 | 11/2006 | Granito |
| 2007/0081651 A1 | 4/2007 | Iyer et al. |
| 2009/0009343 A1 | 1/2009 | Boyer et al. |

\* cited by examiner

At desk: free  in call 
Forwarding: forwarded 
Substitute: no free/busy information 
Unavailable: no free/busy information 
FIG. 11

SYSTEM AND METHOD FOR AUTOMATED CONNECTION TRIGGERED BY AVAILABILITY STATUS

CROSS-REFERENCE TO RELATED APPLICATION

This application is a continuation of U.S. patent application Ser. No. 11/318,486, filed Dec. 28, 2005, and is incorporated herein by reference in its entirety.

BACKGROUND

In a typical communication system, one party contacts another and waits for the other party to respond, thereby forming a connection between them. If the other party does not respond, the first party either leaves a message or tries again later when the other party is likely to be available to respond. If the first party leaves a message, then the first party tends to wait around for the other party to make contact and often forgoes contacting others in fear of being unavailable when the other party tries to make contact. Or if the first party tries to contact the other party again later, there is no guarantee that the other party will respond the second time either. In both cases, the first party wastes time and effort in contacting the other party.

Conversely, if the parties have arranged a connection at a particular time with the first party is to contact the other party, the other party may wait around for the contact and ignore other contacts in fear of being unavailable when the first party tries to make contact. In this case, the other party wastes time and effort in waiting from contact from the first party.

Accordingly, there is a need in the art for a method and system that allows parties wishing to contact each other to do so efficiently.

BRIEF DESCRIPTION OF THE DRAWINGS

FIG. 11 shows examples of status indicators according to an embodiment of the present invention.

DETAILED DESCRIPTION

Embodiments of the present invention combine availability status and contact information to provide automatic connection when one or more parties to the connection are unavailable during the initial connection attempt. The automatic connection advantageously allows the contacting party to attempt the connection only once. Then, the communication system takes over and makes the connection when all the parties are available, using the contact information.

Availability status may indicate whether a party is involved in another connection, out of the office, or otherwise unavailable to communicate at the time of the attempted connection. Contact information may include the identification of a party and/or of the party's communication device with which to connect when the party becomes available. Such contact information may include the contacted party's telephone number, device internet address, email address, etc.

Figure 1:
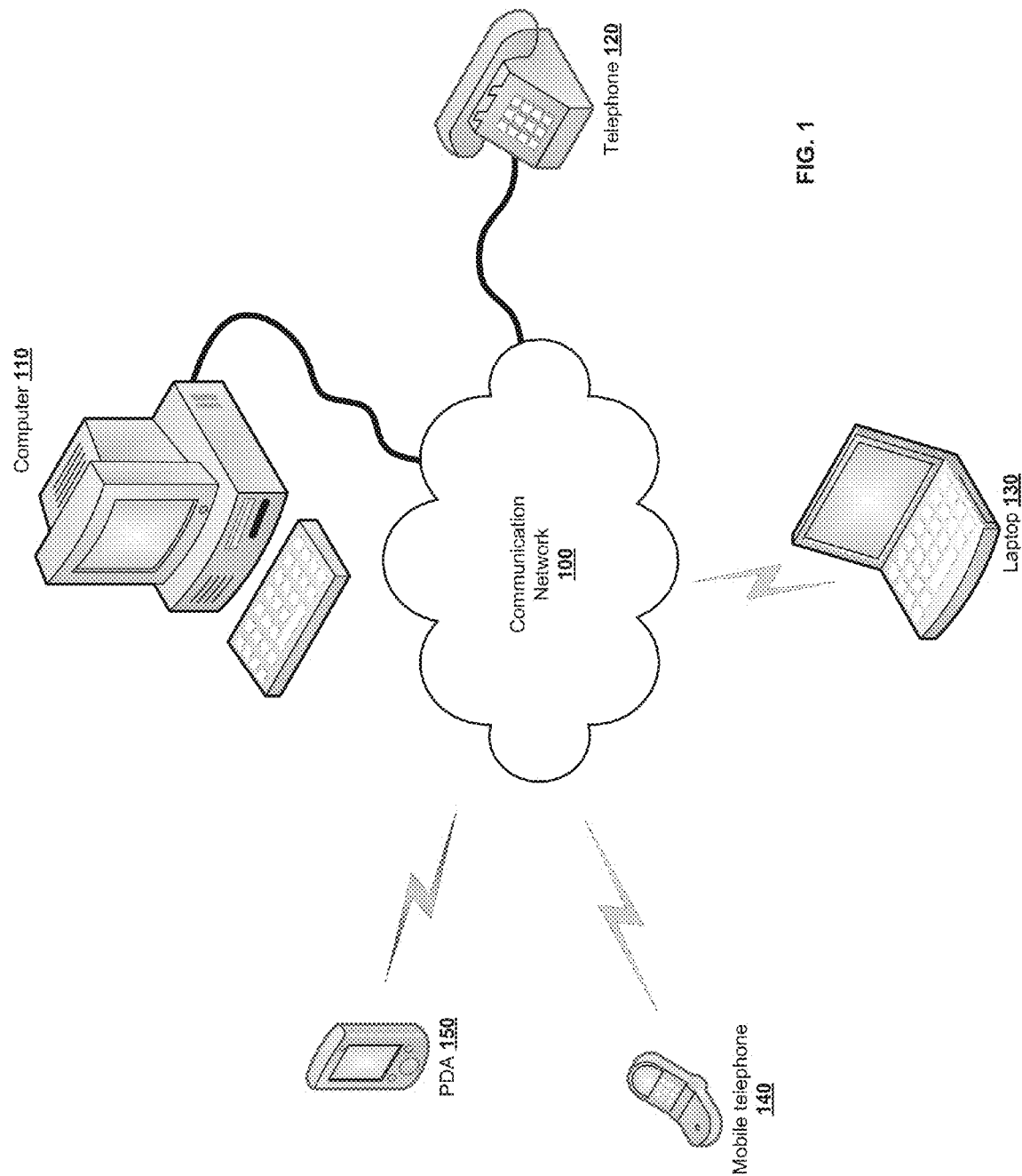
FIG. 1 illustrates a system for implementing embodiments of the present invention.

FIG. 1 shows a system that may implement an embodiment of the present invention. A communication network 100 may connect multiple communication devices, e.g., a wired telephone 120, a mobile telephone 140, a desktop computer 110, a laptop computer 130, and a personal digital assistant (PDA) 150. It is to be understood that the communication devices that may be used in embodiments of the present invention are not limited to those shown, but may include any such device capable of transmitting and receiving messages.

Figure 2:
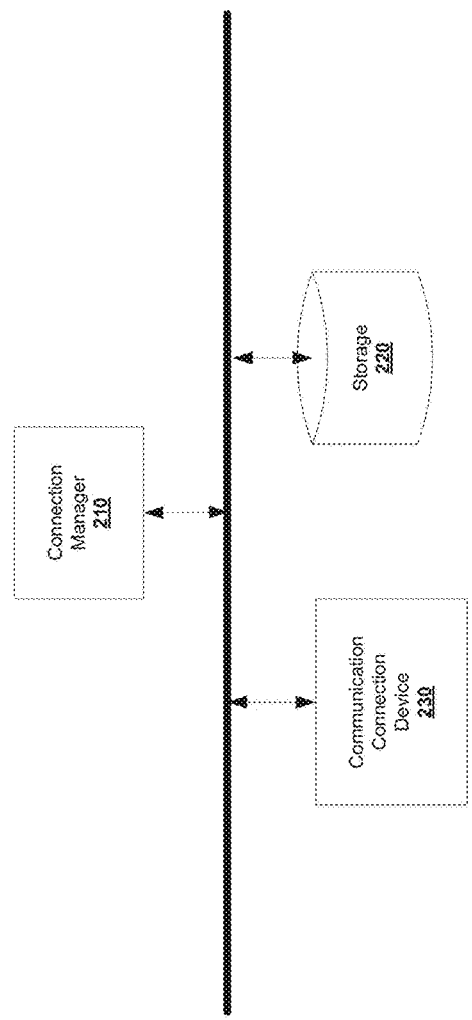
FIG. 2 illustrates an embodiment of a communication network of the present invention.

FIG. 2 illustrates an embodiment of a communication network of the present invention. The communication network 100 may include a connection manager 210, a storage device 220, and a communication connection device 230. In this embodiment, the connection manager 210 may manage an automatic connection between a contacting party and a contacted party. The connection device 230 may make the connection upon direction by the connection manager 210. And the storage device 220 may store a request to make the connection that the connection manager 210 uses to direct the connection device 230.

In this embodiment, the contacting party may attempt to connect to the contacted party, but the contacted party may not be available. The contacting party may send a signal to the connection manager 210 that the contacted party is not available. The connection manager 210 may generate a connection request that includes the contact information for the contacting and contacted parties and then store the request in the storage device 220 to be executed when the contacted party becomes available. Alternately, the connection manager 210 may monitor the availability status of all the parties on the network 100 and, when there is a failed connection to an unavailable party, automatically generate and store the connection request.

The connection manager 210 may await an input indicating that the contacted party has become available. Upon receipt of this input, the connection manager 210 may search the storage device 220 for a pending connection request that includes the contact information of the now-available contacted party. If such a request is found, the connection manager 210 may retrieve the contact information of the contacting and contacted parties and direct the communication connection device 230 to make the connection using the retrieved contact information. The connection device 230 may then connect to the contacting and contacted parties, who may begin communicating.

Additionally, prior to making the connection, when the contacted party becomes available, the connection manager 210 may determine whether the contacting party is still available. If so, the connection manager 210 may then direct the connection device 230 to make the connection. Otherwise, the connection manager 210 may await an input indicating that the contacting party has become available again.

Figure 3:
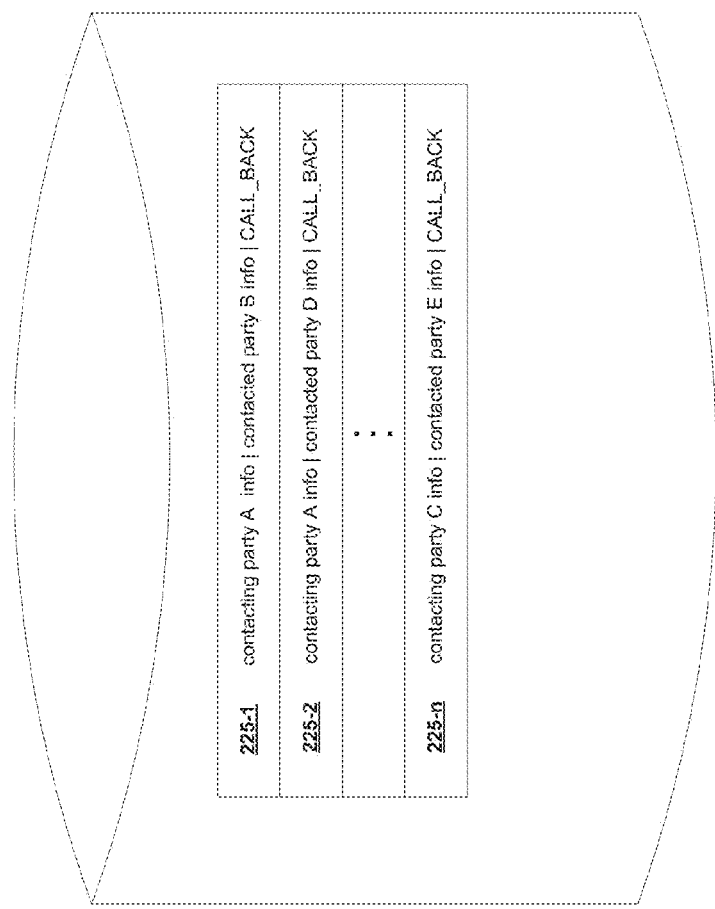
FIG. 3 illustrates an example of data records of an automatic connection request in accordance with an embodiment of the present invention.

FIG. 3 illustrates an example of data records of an automatic connection request generated by a connection manager and stored in a storage device for execution when the parties to a connection become available. In this example, a connection request 225 may include the contact information for the contacting party and the contacted party and a flag set to "CALL_BACK" to indicate that the connection should be automatically made when the parties become available. Where there are multiple pending connection requests for the same party, any conflict resolution scheme may be used to decide which request to execute first.

Figure 4:
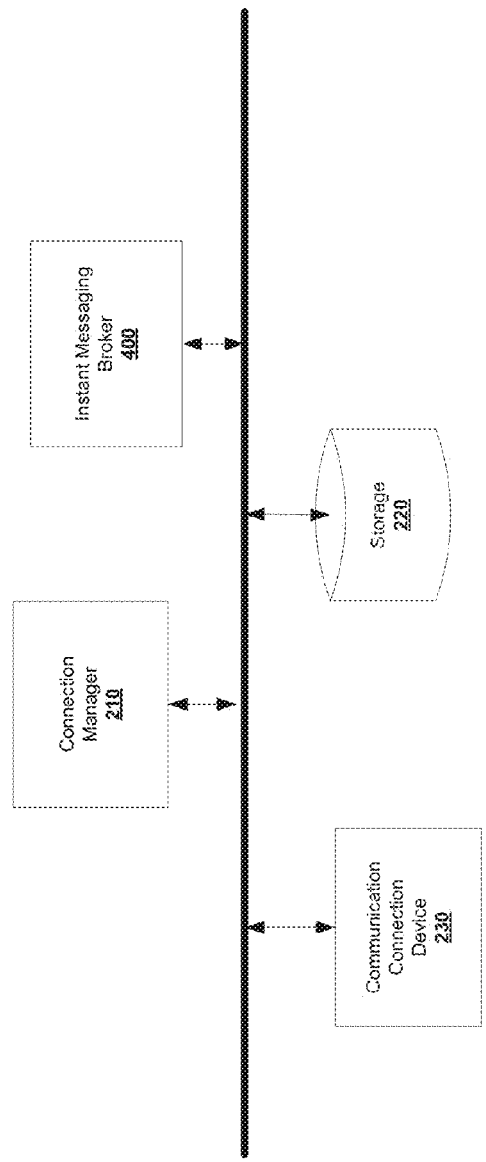
FIG. 4 illustrates another embodiment of a communication network of the present invention that includes an instant messaging broker.
Figure 5:
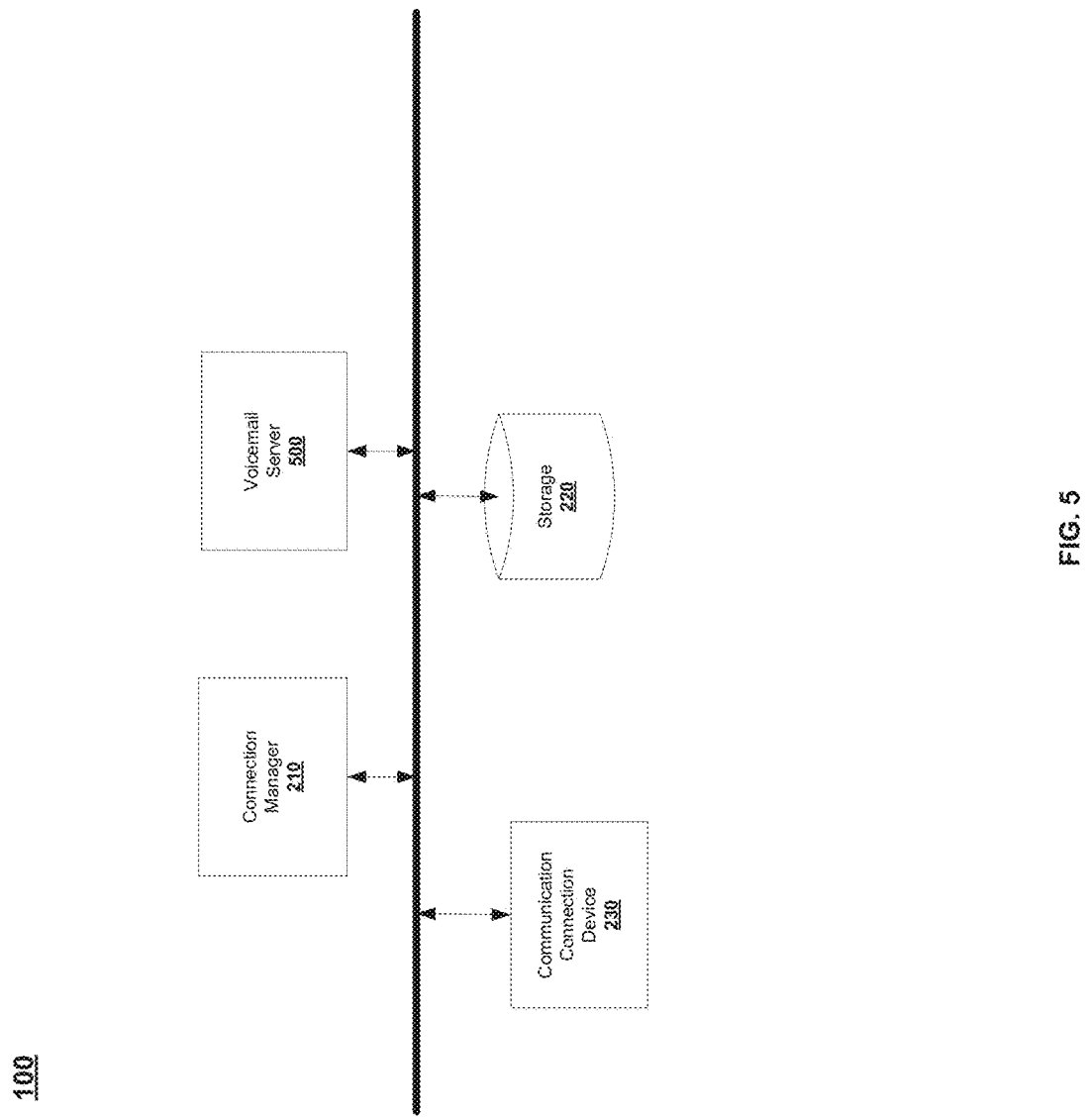
FIG. 5 illustrates another embodiment of a communication network of the present invention that includes a voicemail server.
Figure 6:
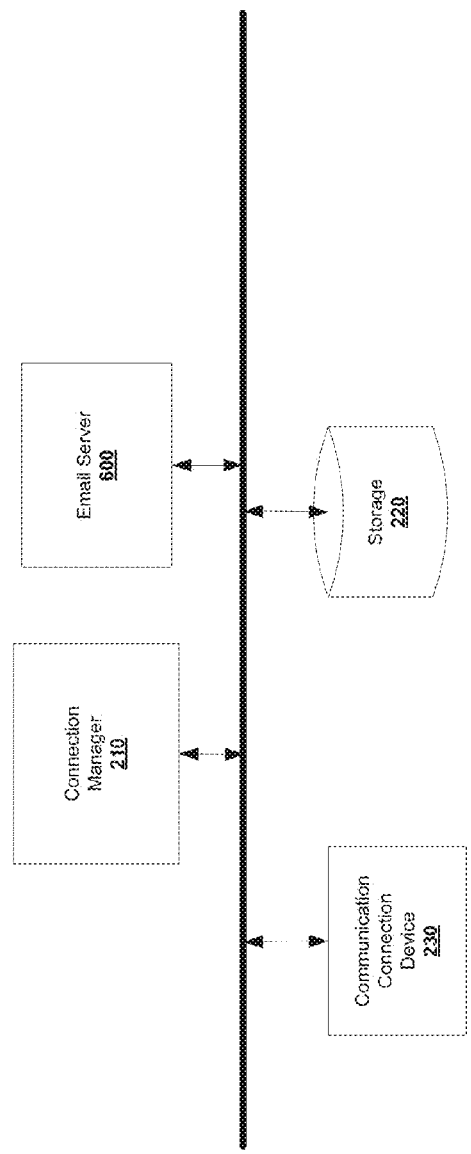
FIG. 6 illustrates another embodiment of a communication network of the present invention that includes an email server.

Embodiments of the present invention may be independent of the particular communication network upon which they are implemented. FIGS. 4-6 illustrate embodiments of the present invention implemented on several different communication networks.

FIG. 4 illustrates an embodiment of the present invention implemented on an instant messaging network that includes an instant messaging broker. In this embodiment, the instant messaging broker 400 may manage the availability status information of the parties and provide this information to the connection manager 210. For example, the instant messaging broker 400 may send a signal to the connection manager 210 when it receives an "unavailable" status of the contacted party or when a reply is not sent from the contacted party within a specified period of receiving a message from the contacting party. Alternatively, the contacting party may send a signal to the connection manager 210 when the contacting party is unsuccessful in connecting with the contacted party.

The instant messaging broker 400 may send a signal to the connection manager 210 that the contacted party is available when the broker 400 receives an "available" status of the contacted party or when the broker 400 detects an instant message being sent by the contacted party or when there is any other indication that the contacted party has become available.

The communication connection device 230 may connect the contacting and contacted parties through their computers to communicate via the internet or through their telephones to communicate via telephone call. The connection manager 210 and the storage device 220 may perform as discussed above in FIG. 2.

One example of this embodiment may combine instant messaging and telephony. An instant messaging system, such as the SAP real-time communications (RTC) or Microsoft messenger, may allow real-time message exchange between parties over the internet or the telephone. Instant messaging solutions also generally offer user availability or presence information. The presence information of a user indicates to other users whether the user is available for communication. A telephony system, such as the Siemens Hipath Procenter or the 3Com SuperStack 3 NBX System, may offer a callback option if the called number is busy. If the called party is on the telephone when the call is placed, the caller can press the "callback" button on the caller's telephone. As soon as the called number becomes free, the connection may be established automatically.

In this example, the automatic connection request may be provided by combining the presence functionality of the instant messaging system and the callback functionality of the telephony system. Pressing the "callback" button when the person who is called has set his or her presence state to "unavailable" delays the call until the person becomes available. As soon as the person who is called sets his or her presence state to "available," the call is automatically placed.

FIG. 5 illustrates an embodiment of the present invention implemented on a telephony network that includes a voicemail server. In this embodiment, the voicemail server 500 may manage the availability status information of the parties and provide this information to the connection manager 210. For example, when a contacting party attempts to call a contacted party and the contacted party's voicemail answers, the voicemail server 500 may send a signal to the connection manager 210 that the contacted party is unavailable. Or the voicemail server 500 may send a signal when the number of voicemail messages exceeds a specified number or when the contacted party has not checked messages for a specified time period. Alternatively, when the contacting party reaches the contacted party's voicemail, the contacting party may send a signal to the connection manager 210 that the contacted party is unavailable.

The voicemail server 500 may send a signal to the connection manager 210 that the contacted party is available when the contacted party accesses his voicemail or when the contacted party makes a telephone call from the telephone number identified in the connection request or when there is any other indication that the contacted party has become available.

The communication connection device 230 may connect the contacting and contacted parties through their telephones to communicate via telephone call. The connection manager 210 and the storage device 220 may perform as discussed above in FIG. 2.

FIG. 6 illustrates an embodiment of the present invention implemented on an internet network that includes an email server. In this embodiment, the email server 600 may manage the availability status information of the parties and provide this information to the connection manager 210. For example, the email server 600 may send a signal to the connection manager 210 that the contacted party is unavailable when the party's "out of office" auto-reply is turned on or when the number of emails in the party's Inbox exceeds a specified number or when an email is unanswered for a specified time period. Alternatively, the contacting party may send a signal to the connection manager 210 that the contacted party is unavailable when the contacting party receives the "out of office" auto-reply or when the contacted party does not reply as quickly as the contacting party desires.

The email server 600 may send a signal to the connection manager 210 that the contacted party has become available when the contacted party's "out of office" auto-reply is turned off or when the server 600 detects either an email being sent from the contacted party's email address or access to the contacted party's Inbox or when there is any other indication that the contacted party has become available.

The communication connection device 230 may connect the contacting and contacted parties through their internet devices to communicate via internet. The connection manager 210 and the storage device 220 may perform as discussed above in FIG. 2.

Figure 7:
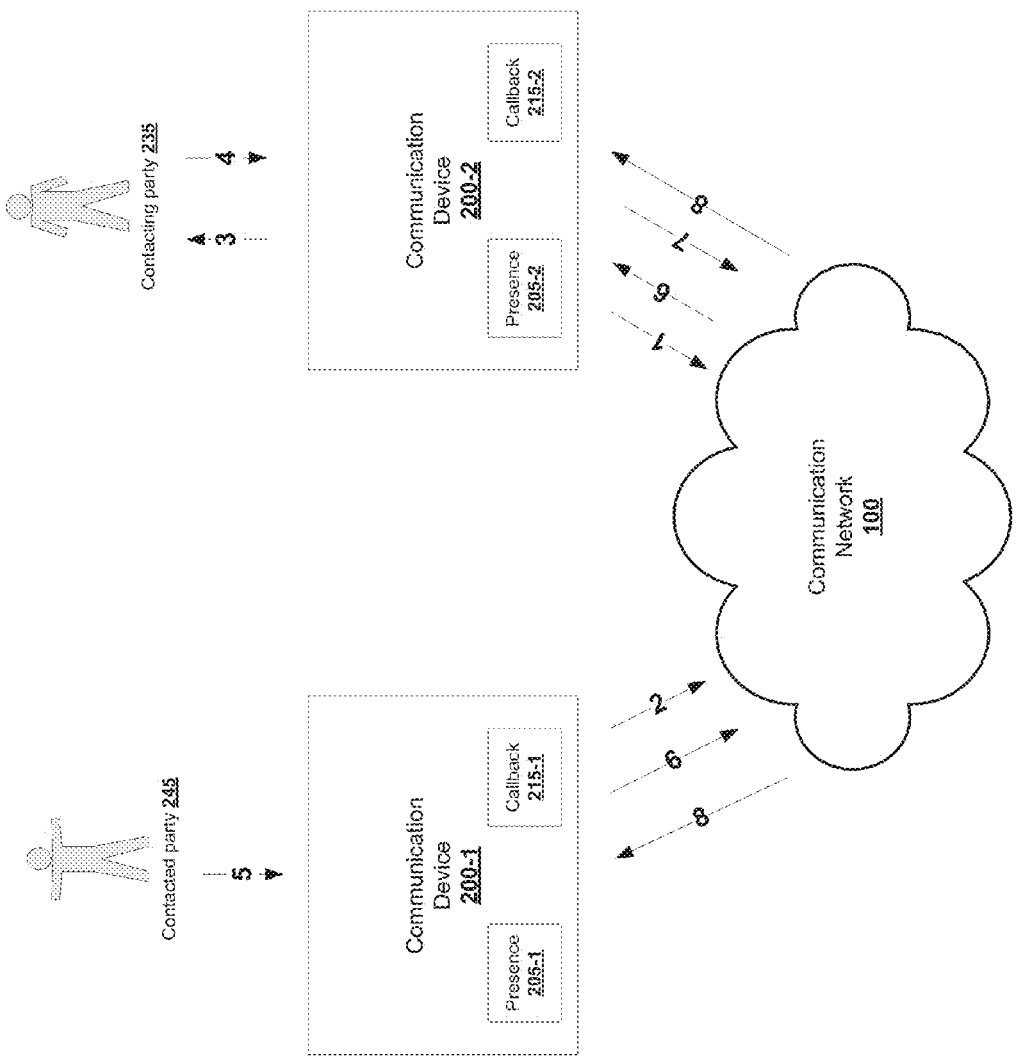
FIG. 7 illustrates how data flows according to an embodiment of the present invention managed by a communication device.

FIG. 7 illustrates an embodiment of the present invention in which a communication device acts as the connection manager on the communication network to manage the automatic connection. In this embodiment, there are two communication devices 200-1 and 200-2 in communication with each other via communication network 100. The communication device 200-2 manages the automatic connection. The contacting party 235 may communicate via communication device 200-2 and the contacted party 245 via communication device 200-1. Each communication device 200 may include a presence feature 205 and a callback feature 215. The presence feature 205 may include software to track the status of all the parties connected to the network 100 and to accept status inputs from the device user. The callback feature 215 may include software and/or hardware that the device user sets to signal that the device user wants a connection to be automatically made when the desired parties become available.

In FIG. 7, an automatic connection between the contacting party 235 and the contacted party 245 may be made as follows. (1) The contacting party 235 using communication device 200-2 may try to connect to the contacted party 245 on communication device 200-1 via communication network 100. (2) Communication device 200-1 may send a "free" signal, indicating that it is not in use. However, the contacted party 245 may not reply. (3) The contacting party 235 may optionally check the availability of the contacted party 245 by checking the presence feature 205-2 on communication device 200-2. The presence feature 205-2 may display to the contacting party 235 the availability status of the contacted party 245. (4) If the presence feature 205-2 on communication device 200-2 indicates that the contacted party 245 is unavailable, the contacting party 235 may set the callback feature 215-2 on communication device 200-2. The communication device 200-2 may then store a connection request, including the contact information for communication device 200-1, to connect to communication device 200-1 when the contacted party 245 becomes available. (5) The contacted party 245 may update the contacted party's status to available in the presence feature 205-1 of communication device 200-1. (6) The communication device 200-1 may send the status update to communication device 200-2 via communication network 100. The presence feature 205-2 on communication device 200-2 may update the contacted party's status to available. (7) Communication device 200-2 may execute the stored connection request and trigger the connection with the contacted party 245 on communication device 200-1. To do this, communication device 200-2 may read the contact information of communication device 200-1 in the request and send a connection signal or command to the connection network 100 to contact device 200-1. (8) The connection network 100 may make the connection. Communication device 200-2 may then notify the contacting party 235 that the connection is being made. Communication device 200-1 may then notify the contacted party 245 that there is an incoming communication.

In this embodiment, the communication devices 200 combine the presence feature 205 and the callback feature 215 in a single device. In an alternate embodiment, the features may be in separate devices capable of communicating with each other directly or via the communication network 100. For example, the presence feature may be in a PDA 150 and the callback feature may be in a wired telephone 120, where both devices are connected via communication network 100.

Figure 8:
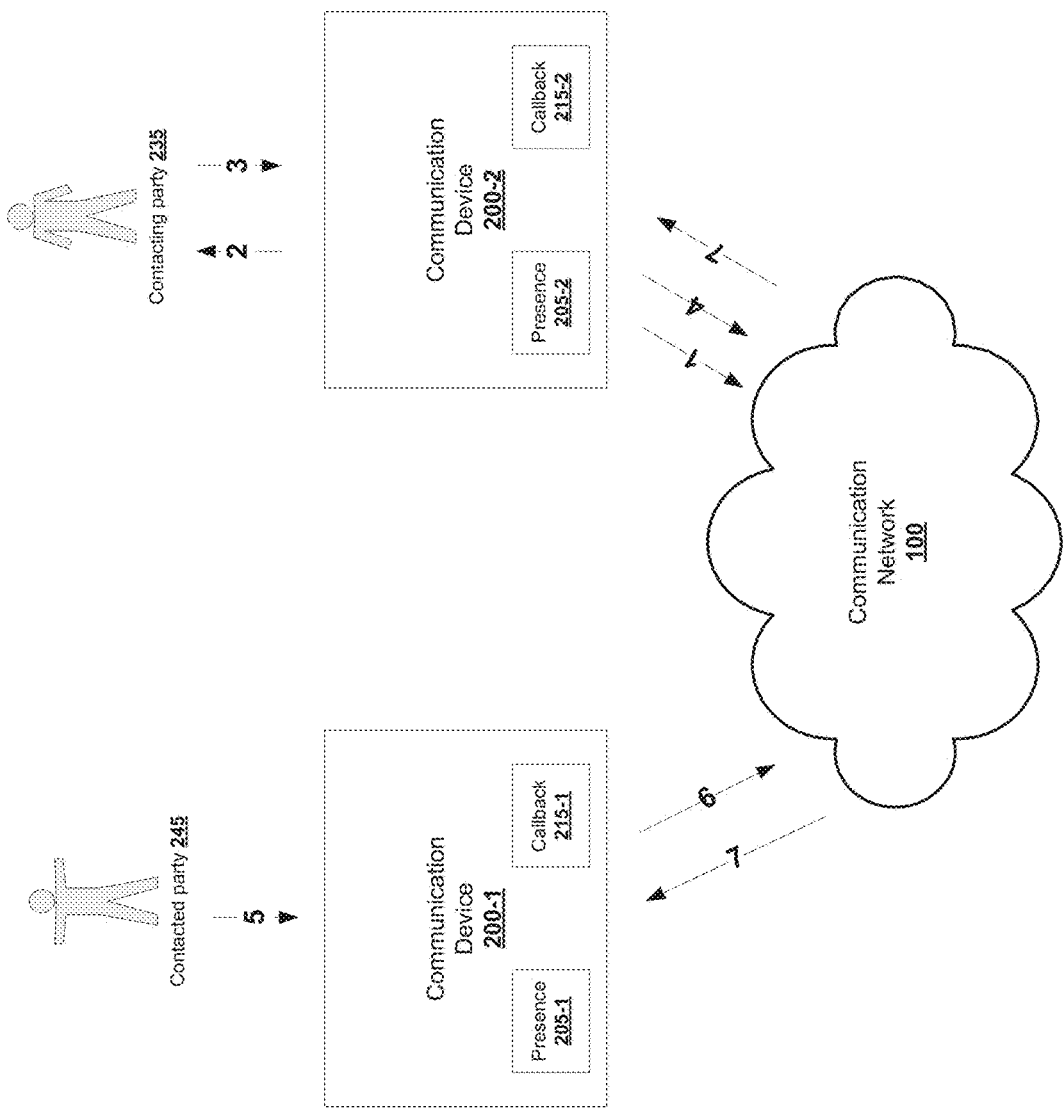
FIG. 8 illustrates how data flows according to another embodiment of the present invention managed by a communication network.

FIG. 8 illustrates another embodiment of the present invention in which the connection manager in the communication network manages the automatic connection. An automatic connection between the contacting party 235 and the contacted party 245 may be made as follows. (1) The contacting party 235 using communication device 200-2 may try to connect to the contacted party 245 on communication device 200-1 via communication network 100. (2) The communication device 200-2 may use the presence feature 205-2 to track and display the availability status of the contacted party 245 to the contacting party 235. (3) If the presence feature 205-2 on communication device 200-2 indicates that the contacted party 245 is unavailable, the contacting party 235 may set the callback feature 215-2 on communication device 200-2. (4) The communication device 200-2 may then forward a signal, including the contact information for communication device 200-1, to the communication network 100 to queue a connection request. (5) The contacted party 245 may update the contacted party's status to available in the presence feature 205-1 of communication device 200-1. (6) The communication device 200-1 may send the status update to the communication network 100. The presence feature 205-2 on communication device 200-2 may update the contacted party's status to available. (7) The communication network 100 may unqueue and execute the connection request and connect the communication devices 200. Communication device 200-2 may then notify the contacting party 235 that the connection is being made. Communication device 200-1 may then notify the contacted party 245 that there is an incoming communication.

Figure 9:
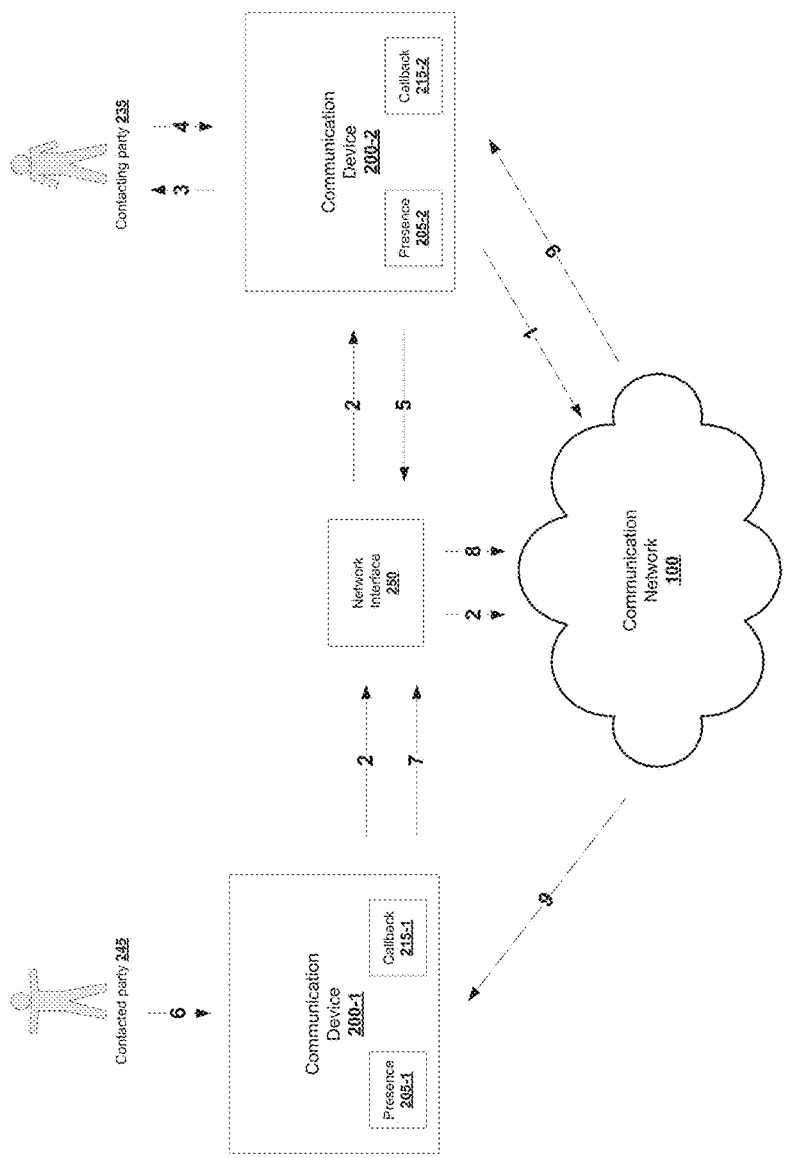
FIG. 9 illustrates how data flows according to another embodiment of the present invention managed by a network interface.

FIG. 9 illustrates another embodiment of the present invention in which a network interface acts as the connection manager on the communication network to manage the automatic connection. This embodiment includes a network interface 250 in communication with the communication devices 200-1 and 200-2 and the communication network 100.

In FIG. 9, an automatic connection between the contacting party 235 and the contacted party 245 may be made as follows. (1) The contacting party 235 using communication device 200-2 may try to connect to the contacted party 245 on communication device 200-1 via communication network 100. (2) The network interface 250 may receive the availability status of the contacted party 245 from communication device 200-1 and forward that status to the communication network 100 and the communication device 200-2. (3) The contacting party 235 may check the availability of the contacted party 245 by checking the presence feature 205-2 on communication device 200-2. (4) If the presence feature 205-2 on communication device 200-2 indicates that the contacted party 245 is unavailable, the contacting party 235 may set the callback feature 215-2 on communication device 200-2. (5) The communication device 200-2 may then forward a signal, including the contact information for communication device 200-1, to the network interface 250 to queue a connection request. (6) The contacted party 245 may update the contacted party's status to available in the presence feature 205-1 of communication device 200-1. (7) The communication device 200-1 may send the status update to the network interface 250. The presence feature 205-2 on communication device 200-2 may update the contacted party's status to available. (8) The network interface 250 may then execute the connection request and trigger the communication network 100 to connect the communication devices 200. The network interface 250 may trigger the connection network 100 by sending a connection signal or command to the network 100. (9) Connection network 100 may then connect the communication devices 200. Communication device 200-2 may notify the contacting party 235 that the connection is being made. Communication device 200-1 may then notify the contacted party 245 that there is an incoming communication.

Figure 10:
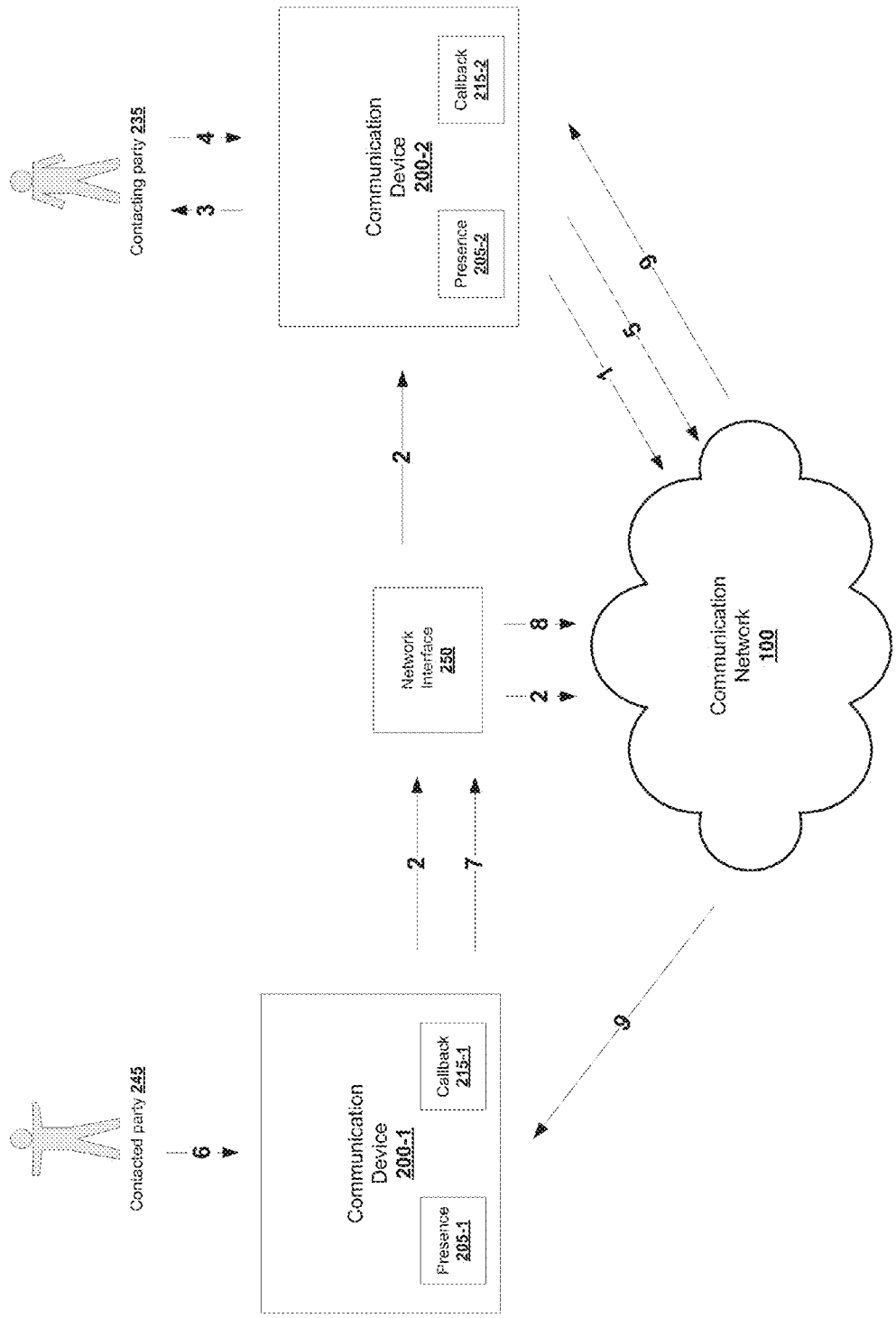
FIG. 10 illustrates how data flows according to another embodiment of the present invention managed by a communication network.

FIG. 10 illustrates another embodiment of the present invention in which the connection manager of the communication network manages the automatic connection. An automatic connection between the contacting party 235 and the contacted party 245 may be made as follows. (1) The contacting party 235 using communication device 200-2 may try to connect to the contacted party 245 on communication device 200-1 via communication network 100. (2) The network interface 250 may contact the communication device 200-1 for the availability status of the contacted party 245 and forward that status to the communication network 100 and the communication device 200-2. (3) The contacting party 235 may check the availability of the contacted party 245 by checking the presence feature 205-2 on communication device 200-2. (4) If the presence feature 205-2 on communication device 200-2 indicates that the contacted party 245 is unavailable, the contacting party 235 may set the callback feature 215-2 on communication device 200-2. (5) The communication device 200-2 may then forward a signal, including the contact information for communication device 200-1, to the communication network 100 to queue a connection request. (6) The contacted party 245 may update the party's status to available in the presence feature 205-1 of communication device 200-1. (7) The communication device 200-1 may send the status update to the network interface 250. The presence feature 205-2 on communication device 200-2 may update the contacted party's status to available. (8) The network interface 250 may inform the communication network 100 that the contacted party 245 is now available. (9) Connection network 100 may then connect the communication devices 200. Communication device 200-2 may notify the contacting party 235 that the connection is being made. Communication device 200-1 may then notify the contacted party 245 that there is an incoming communication.

In an alternate embodiment, the system may take into account the status of the contacting party 235 in addition to the contacted party 245. If the contacting party 235 becomes unavailable after making the callback request, the system may not make the connection until the contacting party 235 is again available, along with the contacted party 245. For example, if the contacting party 235 is unavailable, but the contacted party 245 becomes available, the system may wait until the status of the contacting party 235 again becomes available and the status of the contacted party 245 remains available before automatically making the connection.

FIG. 11 shows examples of status indicators that may be displayed by the presence feature 205 on the communication devices 200 according to an embodiment of the present invention. If a party is at the party's work desk and the party's communication device is not in use, the status indicator in the communication network 100 may be "free." If a party is at the party's work desk and the party's communication device is in use, the status indicator in the communication network 100 may be "in call." If a party is at a location other than the party's work desk and the party wants to receive any incoming connections, the status indicator in the communication network 100 may be "forwarded."

If another party has been substituted for the intended party to the connection, the status indicator in the communication network 100 may be "no free/busy information" of the substitute party. If a party is unavailable, the status indicator in the communication network 100 may be "no free/busy information" of the unavailable party.

Figure 12:
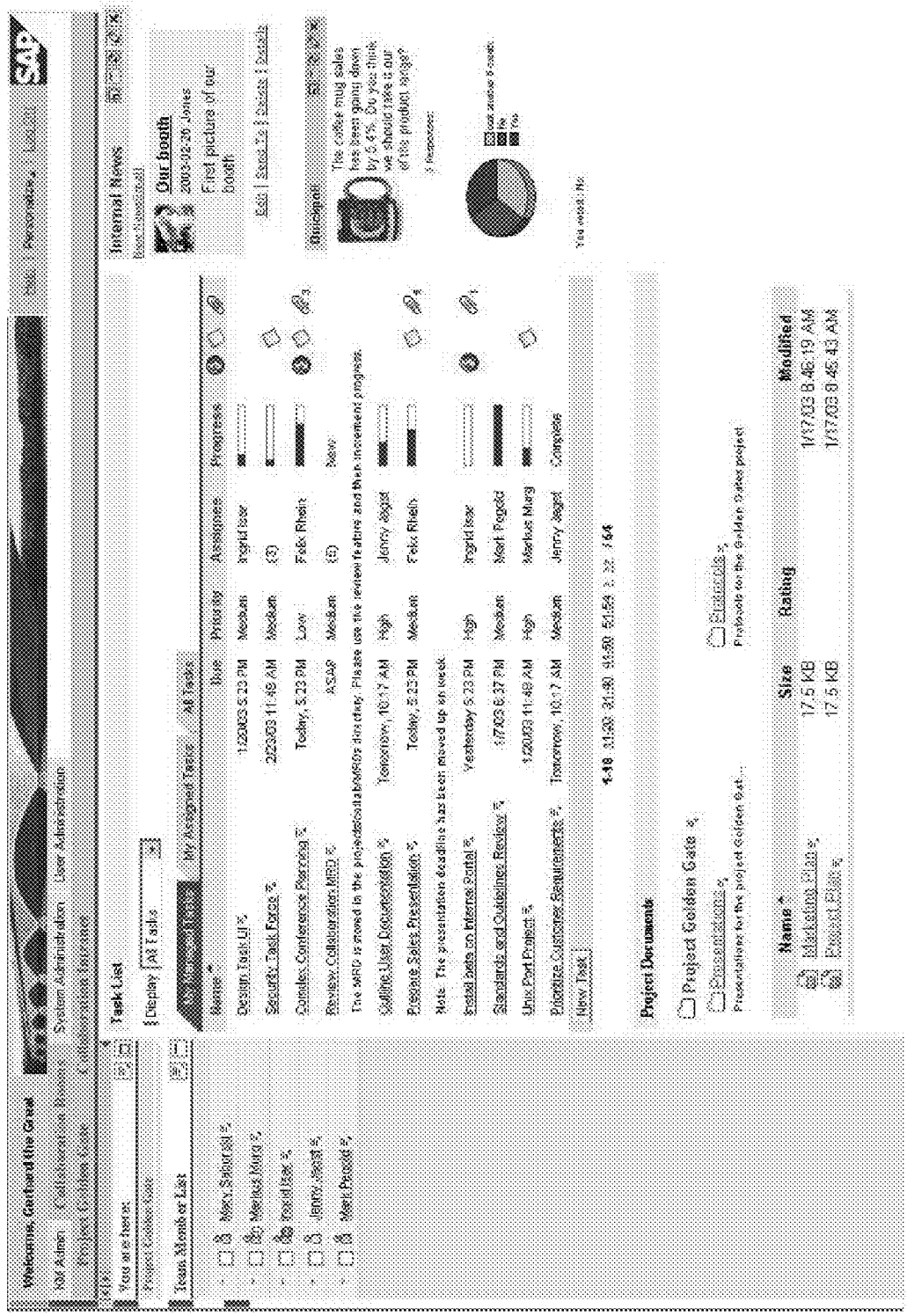
FIG. 12 shows an example of an implementation of an embodiment of the present invention.

FIG. 12 shows an implementation example of an embodiment of the present invention, in which the status indicators appear in a virtual collaboration room, which may be displayed on a party's communication device. Here, the status indicators appear in the left portion of the screen beside the names of the parties involved in the collaboration.

In this example, a party "Gerhard the Great" has established a virtual collaboration room in which he and five of his colleagues are to join for a collaborative conference. The status of Gerhard's five colleagues is shown in the collaboration screen. Here all of the colleagues are available for the collaboration except "Ingrid Isar," as shown by the status indicators. When Gerhard selected his five colleagues, the collaboration room application on Gerhard's communication device received and displayed each colleague's status. Connections were made by the communication network to the communication devices of the four colleagues whose status indicators showed that they were available. A connection to the communication device of Ms. Isar, the colleague whose status indicator showed that she was unavailable, will be automatically made by the communication network 100 when she becomes available. Gerhard does not need to retry the connection himself.

Several embodiments of the invention are specifically illustrated and/or described herein. However, it will be appreciated that modifications and variations of the invention are covered by the above teachings and within the purview of the appended claims without departing from the spirit and intended scope of the invention.

The invention claimed is:

1. A method comprising:
   receiving a signal, the signal indicating that an availability status of a contacted party is set as not available at a connection device;
   responsive to receiving the signal, generating an automatic connection request to connect to the contacted party;
   storing the automatic connection request in memory;
   receiving a second signal, the second signal indicating that the availability status of the contacted party has changed from not available to available;
   in response to receipt of the second signal indicating the changed availability status:
      determining whether the automatic connection request is pending,
      determining an availability status of a contacting party, and
      if the automatic connection request is pending and if the availability status of the contacting party is set as available, automatically connecting the contacting party to the contacted party, the automatically connecting comprising:
         immediately establishing a connection between the connection device and a second connection device of the contacting party, and
         after establishing the connection, notifying the contacting party and the contacted party that the connection is available,
   wherein, for each of the contacting party and the contacted party, the respective availability status is set as:
      available when the respective connection device of the respective party is not engaged in another connection at the time of the changed availability status, and
      not available when respective connection device of the respective party is engaged in another connection at the time of the changed availability status.

2. The method of claim 1, wherein the determining whether the automatic connection request is pending comprises:
   searching the memory for the automatic connection request including contact information of the contacted party.

3. The method of claim 1, wherein the connecting further comprises:
   retrieving from the memory the automatic connection request including contact information of the available contacted party; and
   using the contact information to connect to the available contacted party at the connection device.

4. The method of claim 1, further comprising:
receiving an input from the contacted party that the contacted party has become available.

5. The method of claim 1, wherein the request is to connect a telephone call with the connected party.

6. A method comprising:
monitoring an availability status of a contacted party at a connection device;
in response to the availability status indicating that the contacted party is not available, automatically generating a request to connect to the contacted party when the contacted party becomes available;
storing the request in memory; and
triggering an automatic connection to the contacted party when:
the availability status is indicated as having changed from not available to available at the connection device,
an availability status of a contacting party indicates that the contacting party is available, and
the request to connect to the contacted party is pending;
wherein the automatic connection comprises:
immediately establishing a connection between the connection device and a second connection device of the contacting party, and
after establishing the connection, notifying the contacting party and the contacted party that the connection is available,
wherein, for each of the contacting party and the contacted party, the respective availability status is set as:
available when the respective connection device of the respective party is not engaged in another connection at the time of the changed availability status, and
not available when respective connection device of the respective party is engaged in another connection at the time of the changed availability status.

7. The method of claim 6, wherein the generating comprises:
receiving an input from the contacting party to connect to the contacted party when the contacted party becomes available; and
generating the request including contact information of the contacted party.

8. The method of claim 6, wherein the storing comprises:
storing in the memory the request including contact information of the contacted party.

9. The method of claim 6, further comprising:
determining that the contacted party is unavailable from an instant message, an email, or a voicemail.

10. A system, comprising:
a connection manager, wherein the connection manager:
generates a request to connect to a contacted party;
monitors an availability status of the contacted party;
responsive to: (i) an indication that the availability status of the contacted party has changed from not available to available, (ii) an indication that the availability status of a contacting party is set to available, and (iii) the request to connect is pending, triggers an automatic connection to the contacted party; and
after triggering the automatic connection, notifying a contacting party and the contacted party that the connection is available, and
a storage device to store the request that is to be executed by the connection manager when the contacted party becomes available,
wherein the automatic connection comprises immediately establishing a connection between the connection device and a second connection device of the contacting party, and
wherein, for each of the contacting party and the contacted party, the respective availability status is set as:
available when the respective connection device of the respective party is not engaged in another connection at the time of the changed availability status, and
not available when respective connection device of the respective party is engaged in another connection at the time of the changed availability status.

11. The system of claim 10, further comprising:
an instant messaging device to provide a first or second signal to the connection manager indicating whether the contacted party is available,
when the contacted party is available, the instant messaging device the first signal when the instant messaging device detects at least one of:
the availability status of the contacted party is available, and
the contacted party sends an instant message, and
when the contacted party is unavailable, the instant messaging device provides the second signal when the instant messaging device detects at least one of:
the availability status of the contacted party is unavailable, and
the contacted party does not send instant messages for a specified time period.

12. The system of claim 10, further comprising:
a voicemail server to provide a first or second signal to the connection manager indicating whether the contacted party is available,
when the contacted party is available, the voicemail server provides the first signal when the voicemail server detects at least one of:
the contacted party accesses the contacted party's voicemail, and
the contacted party makes a telephone call on the telephone associated with the contacted party's voicemail, and
when the contacted party is unavailable, the voicemail server provides the second signal when the voicemail server detects at least one of:
the contacted party's voicemail answers a telephone call,
the contacted party's number of voicemail messages exceeds a specified number, and
the contacted party has not accessed the contacted party's voicemail for a specified time period.

13. A system, comprising:
a connection manager, wherein the connection manager:
generates a request to connect to a contacted party;
monitors an availability status of the contacted party;
responsive to an indication from the availability status that the contacted party is available and an indication from an availability status of a contacting party that the contacting party is available, triggers an automatic connection to the contacted party in response to the request; and
after triggering the automatic connection, notifying a contacting party and the contacted party that the connection is available,
a storage device to store the request that is to be executed by the connection manager when the contacted party becomes available, and an email server to provide a first or second signal to the connection manager indicating whether the contacted party is available, wherein:
when the contacted party is available, the email server provides the first signal when the email server detects at least one of:
the contacted party has turned off the contacted party's automatic reply function,
the contacted party has accessed the contacted party's email folder, and
the contacted party has sent an email and
when the contacted party is unavailable, the email server provides the second signal when the email server detects at least one of:
the contacted party has turned on the contacted party's automatic reply function,
the contacted party's number of emails exceeds a specified number, and
the contacted party has not accessed the contacted party's email for a specified time period.

14. The system of claim 10, further comprising:
a connection device to automatically connect the contacted party to a contacting party upon execution of the connection request by the connection manager.

15. A connection manager comprising:
a processor to:
monitor an availability status of a contacted party at a connection device;
immediately establish a connection from a contacting party to a contacted party, in response to: (i) a connection request, (ii) an indication that the availability status has changed from not available to available, and (iii) an indication that the availability status of a contacting party is set to available; and
subsequently notify the contacting party and the contacted party that the connection is available,
wherein, for each of the contacting party and the contacted party, the respective availability status is set as:
available when the respective connection device of the respective party is not engaged in another connection at the time of the changed availability status, and
not available when respective connection device of the respective party is engaged in another connection at the time of the changed availability status.

16. The connection manager of claim 15, wherein the processor is further configured to
if the contacting party is not available, delay triggering the automatic connection from the contacting party to the contacted party until the contacting party become available.

* * * * *